US006675741B2

(12) United States Patent
Remmler

(10) Patent No.: US 6,675,741 B2
(45) Date of Patent: Jan. 13, 2004

(54) ANIMAL RESTRAINT SYSTEM

(76) Inventor: Thomas E. Remmler, 2145 Edgewood Dr., Sedona, AZ (US) 86336

( * ) Notice: Subject to any disclaimer, the term of this patent is extended or adjusted under 35 U.S.C. 154(b) by 0 days.

(21) Appl. No.: 10/052,610

(22) Filed: Jan. 23, 2002

(65) Prior Publication Data

US 2003/0136354 A1 Jul. 24, 2003

(51) Int. Cl.$^{7}$ .......... A01K 39/00
(52) U.S. Cl. .......... 119/755
(58) Field of Search .......... 119/755, 757, 119/726, 727, 103; 602/5, 19, 23

(56) References Cited

U.S. PATENT DOCUMENTS

| | | | | | |
|---|---|---|---|---|---|
| 3,717,128 | A | * | 2/1973 | Pearman et al. | 119/757 |
| 4,030,719 | A | | 6/1977 | Gabriele et al. | 269/328 |
| 4,184,451 | A | * | 1/1980 | Carlin | 119/755 |
| 4,949,713 | A | * | 8/1990 | Mykietiuch | 602/5 |
| 5,213,062 | A | * | 5/1993 | Canady, Jr. | 119/755 |
| 5,431,623 | A | * | 7/1995 | Rice | 602/26 |
| 5,619,747 | A | * | 4/1997 | Boisclair et al. | 2/465 |
| 5,709,648 | A | * | 1/1998 | Webb | 602/19 |
| 5,725,486 | A | * | 3/1998 | Engelman | 602/5 |
| 5,915,334 | A | * | 6/1999 | Cummings et al. | 119/723 |
| 5,925,005 | A | * | 7/1999 | May | 602/6 |
| 6,443,918 | B1 | * | 9/2002 | Wang | 602/5 |

* cited by examiner

*Primary Examiner*—Robert P. Swiatek
*Assistant Examiner*—Bethany L Griles
(74) *Attorney, Agent, or Firm*—LaValle D. Ptak

(57) ABSTRACT

A shell of an animal restraint system is made from a radiolucent plastic material shaped to conform generally to the back, neck and head of the animal. The shell also has at least one region with a U-shape to permit the animal to be positioned on its back or on either side.

5 Claims, 4 Drawing Sheets

ANIMAL RESTRAINT SYSTEM

TECHNICAL FIELD

This invention is concerned with small animal restraint systems.

BACKGROUND ART

Small animals need to be restrained, i.e., kept still, during radiographic, ultrasound and surgical procedures. In many veterinary hospitals a veterinarian's assistant is required to hold and position the animal even though it is anesthetized. In radiographic procedures this can subject the assistant to potentially dangerous X-rays.

It has, therefore, been proposed to provide some sort of mechanical restraint device to hold the animal still during the procedure. Several such devices are disclosed in U.S. Pat. No. 4,184,451 granted to M. O. Carlin Jan. 22, 1980 for "Restraining Device for Animal Surgery". The devices there disclosed however can only support the animal in supine position permitting only ventro-dorsal radiographic views.

The same is true of a similarly designed child restraint device disclosed in U.S. Pat. No. 4,030,719 granted Jun. 21, 1977 to W. J. Gabriele et al. for "Child Immobilizing Device for X-Rays".

There continues to be a need for a more versatile restraint system.

SUMMARY OF THE INVENTION

This invention contemplates providing a shell formed of radiolucent material contoured to conform generally to the back, neck, and head regions of the animal and having raised side walls in the leg regions of the animal. This shell has formed therein one, and preferable, two transverse regions intermediate its ends having generally U-shaped configurations. These transverse regions permit the shell to be placed on a flat surface with the animal positioned on either side or on its back. A detachable torso strap is preferably provided for holding the animal in the shell.

BRIEF DESCRIPTION OF THE DRAWINGS

The invention is described in greater detail hereinafter by reference to the accompanying drawings wherein.

BEST MODE FOR CARRYING OUT THE INVENTION

Figure 1:
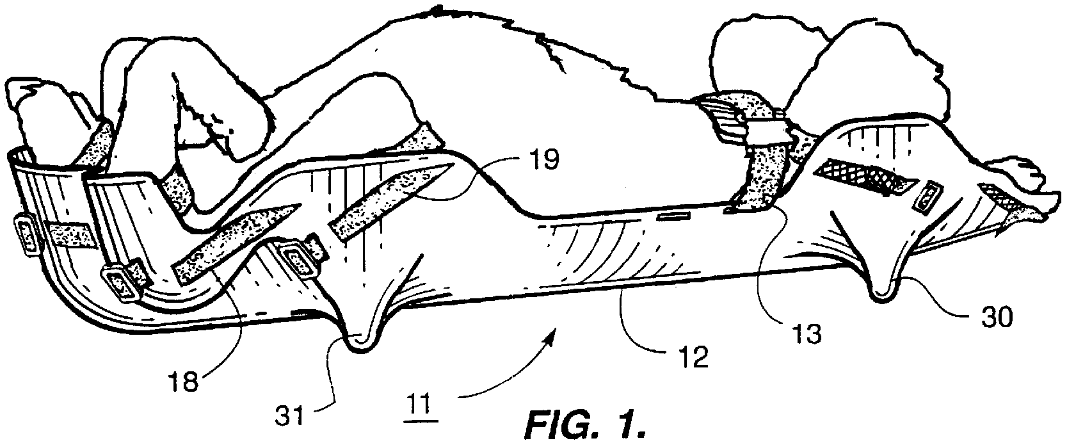
FIG. 1 is a side elevational view of the restraint system with the animal therein on its back.
Figure 2:
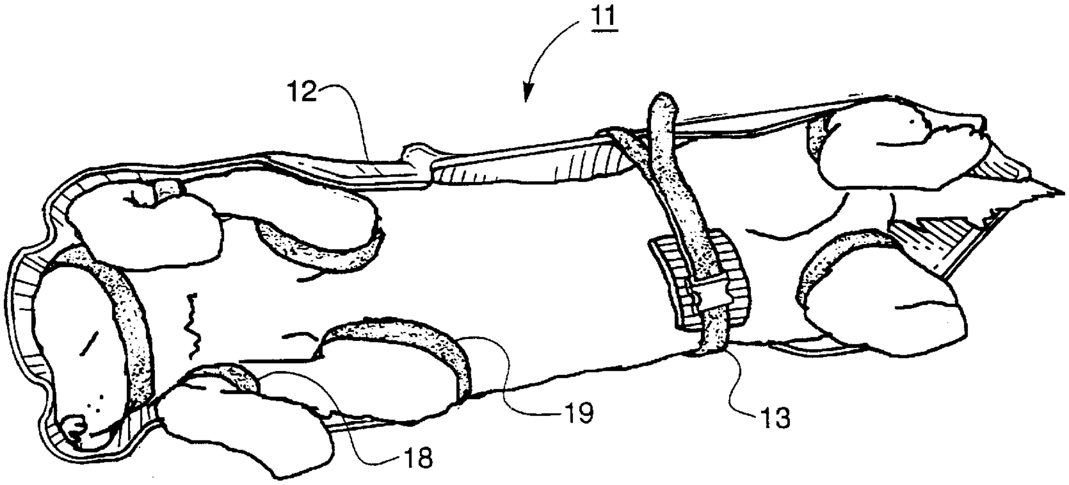
FIG. 2 is a side elevational view of the restraint system with the system and the animal therein on its side.
Figure 3:
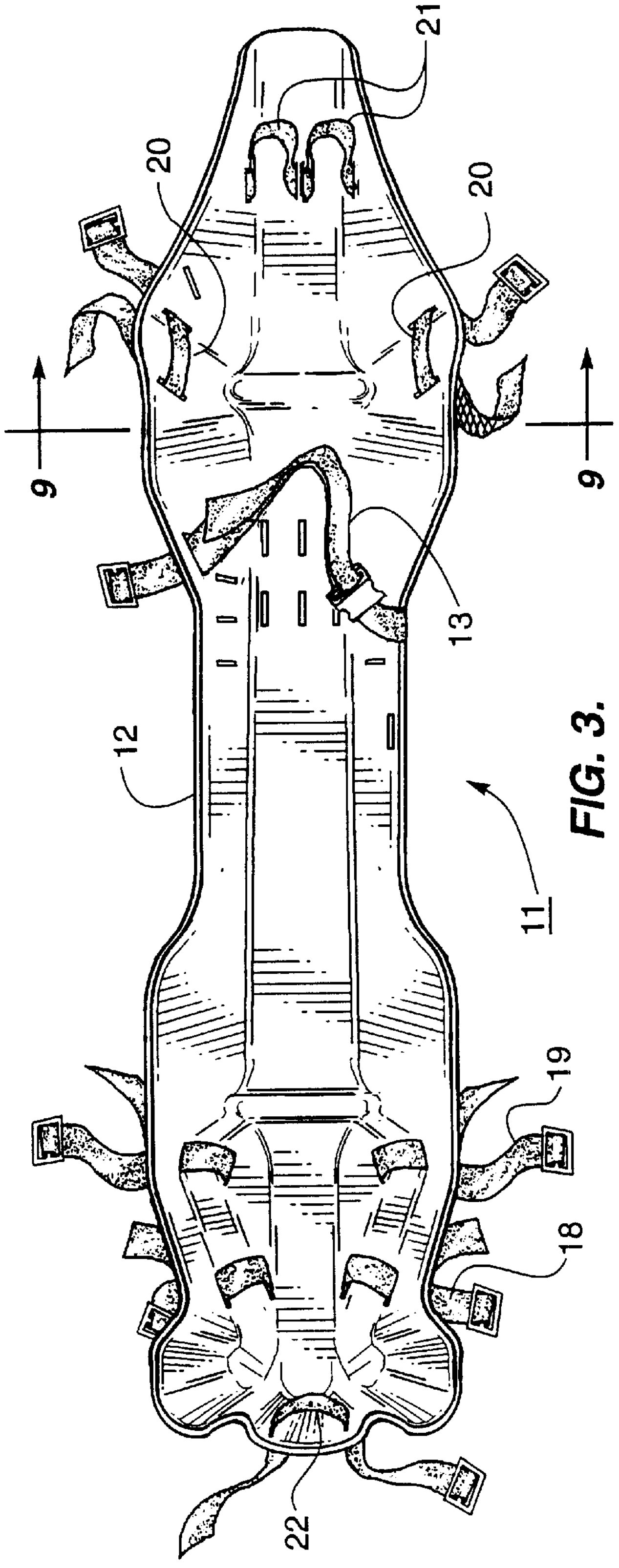
FIG. 3 is a plan view of the restraint system.
Figure 4:
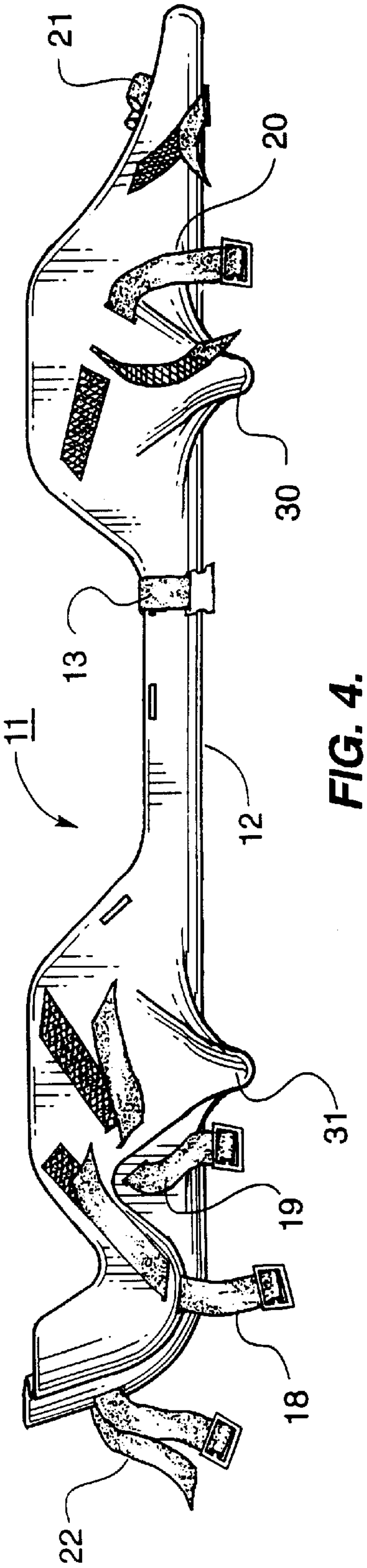
FIG. 4 is a side elevational view of the restraint system.
Figure 5:
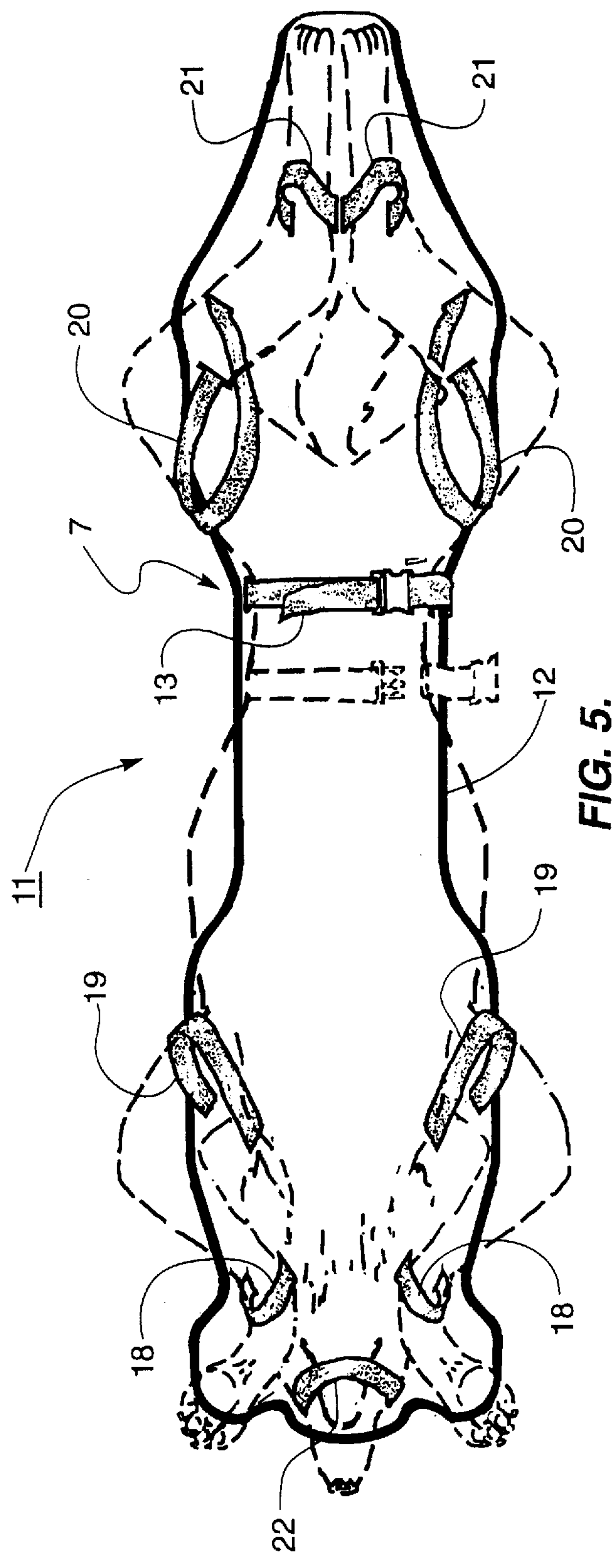
FIG. 5 is a plan view of the restraint system with an animal in phantom to show placement of the restraint straps.
Figure 6:
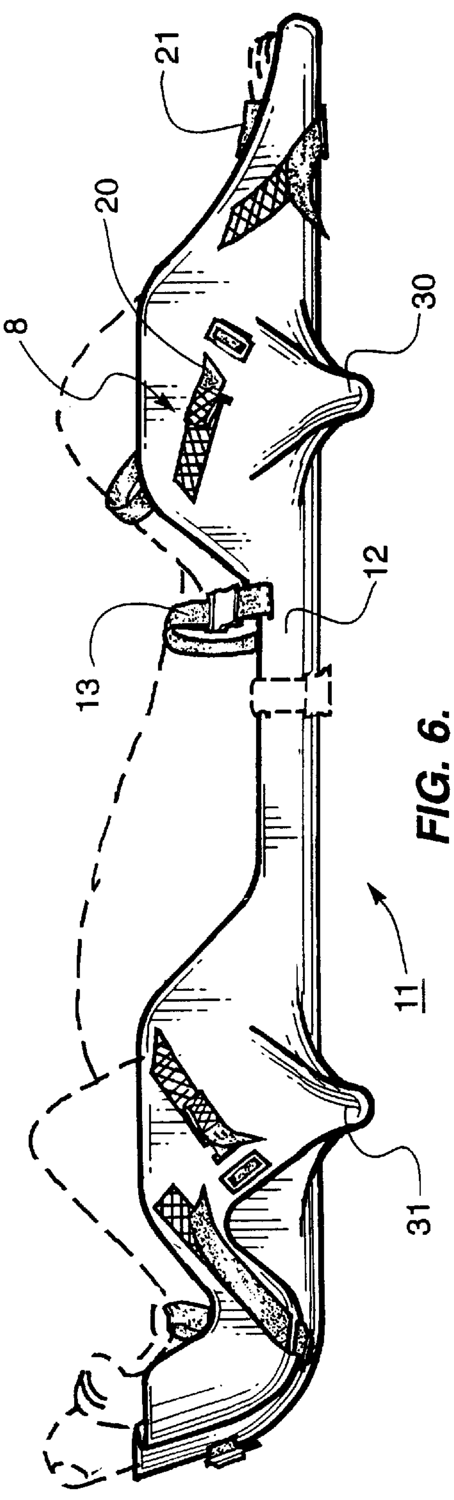
FIG. 6 is a side elevational view of the restraint system with an animal in phantom to illustrate placement of the restraint straps.

In FIGS. 1 and 2 the restraint system of the invention is designated generally by reference numeral 11. With the restraint system positioned as shown in FIG. 1 with the animal on its back the animal is positioned as it might be for surgery, for ultrasonography or radiography for ventro-dorsal views. The restraint system can also be placed on its side to position the animal on its side where left or right lateral radiography views can be taken.

Details of construction of the restraint system 11 are better illustrated in FIGS. 3 through 10. The system includes a shell 12 shaped to conform generally to the back, neck and head region of the animal to be restrained. The shell 12 is preferably thermo-formed from plastic sheet material, such as polyethylene, which is radiolucent. Although less desirable the shell 12 can be rotomolded or injection molded of similar materials.

Figure 7:
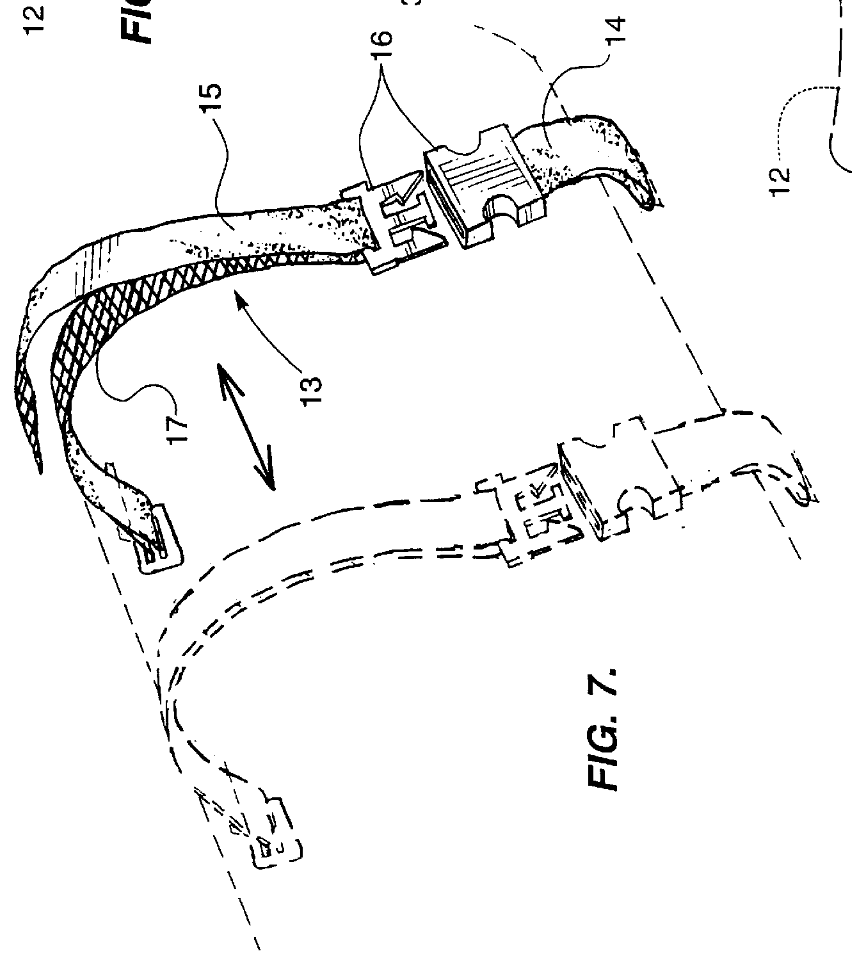
FIG. 7 is a fragmentary perspective view of torso straps employed in the restraint system.

The restraint system 11 further comprises a torso strap 13 preferably positioned on the shell to go across the abdominal region of the animal. The torso strap 13 preferably comprises two sections 14 and 15 joined by a separable buckle 16. Adjustment of the length of torso strap 13 is provided by doubling back strap section 15 on itself with separable hook and loop fastener strips 17 (See FIG. 7). Also as indicated in FIG. 7 attachment of torso strap 13 is such as to permit the strap to be affixed in different positions along the body of the animal. Torso strap 13 is made of a radiolucent fabric and its buckle 16 is made of a radiolucent plastic material.

The restraint system 11 of this invention is designed to position the legs of the animal out of the way of the torso to provide for optimal radiological viewing of the abdominal and thoracic fields. To this end the restraint system 11 includes a plurality of leg straps. For each of the front legs there is provided a carpal strap 18 and a humeral strap 19. For each of the rear legs there are provided a femoral strap 20 and a tarsal strap 21.

There also is preferably provided a muzzle strap 22 for holding the head of the animal still.

Figure 8:
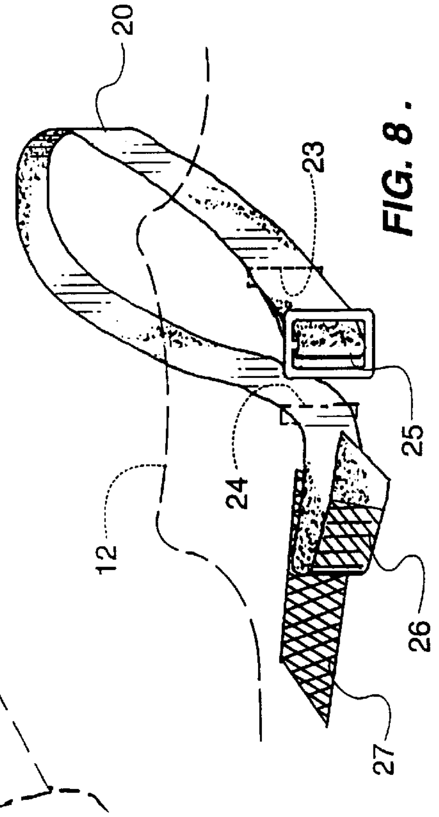
FIG. 8 is a fragmentary perspective view of a restraint strap with its fastener.

Each of the leg straps 18 through 21 and the muzzle strap 22 are constructed and assembled to the shell 12 in the manner of the femoral strap 20 illustrated in FIG. 8. The strap 20 enters an opening 23 in the wall of the shell 12, goes around the animal body part and exits a nearby opening 24 in the shell. The stationary end of strap 20 has affixed thereto a plastic anchor 25 which abuts the outer surface of the shell. The lead portion of the strap 21 has one portion 26 of a hook and loop fastener thereon which mates with the other portion 27 of the fastener which is carried by the outer surface of the shell. It is thus possible to pull the straps snugly around the animal body part and lock it in place with the hook and loop fastener.

It should be noted that the side walls of the shell in the vicinity of the legs of the animal are raised to accommodate the straps.

Figure 9:
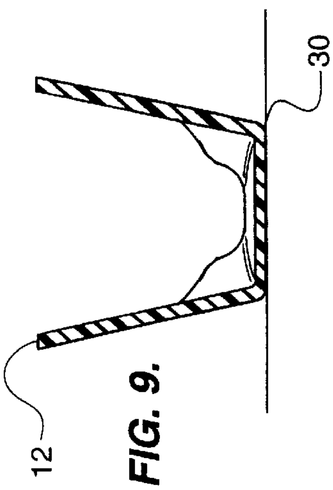
FIG. 9 is a sectional view through the shell of the restraint system taken as indicated by line 9—9 in FIG. 3.
Figure 10:
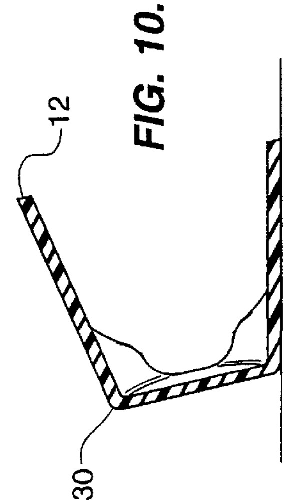
FIG. 10 is a sectional view like FIG. 9, but showing the shell placed on its side.

At least one and preferably two sections 30 and 31 of the shell intermediate its ends have a generally U-shaped configuration, as shown in FIGS. 9 and 10 permitting the shell to rest with the animal supine or on its side. These sections are preferably in the regions of the shell where the side walls are raised as this ensures stability of the restraint system when the animal is positioned on its side. The upright regions of sections 30 and 31 are preferably at slightly more than a 90° angle to the base regions to compensate for the tendency of the body of the animal to sag when placed on its side.

What is claimed is:

1. An animal restraint system into which an animal is placed including in combinaton:

a shell formed of radiolucent material having a base which is contoured to conform generally to the back, neck and head regions of an animal, the shell further having opposite sides formed by raised sidewall portions extending above the base intermediate its ends in the vicinity of the legs of an animal placed in the restraint system, with the raised sidewall portions each having two openings therein and forming a generally U-shaped cross-sectional configuration with the base of the shell to permit the shell to rest on a surface on the base or on either of the opposite sides with the raised sidewall portions resting on a surface with an animal placed in the restraint system;

a detachable torso strap for holding an animal in the shell; and a plurality of detachable leg straps for positioning and holding the legs of an animal; wherein each detachable leg strap passes through one of the openings in one of the raised sidewall portions, is led around the leg of an animal and exits the other opening.

2. The animal restraint system of claim 1 wherein there is a detachable leg strap for each of the four legs of an animal.

3. The animal restraint system of claim 1 wherein the generally U-shaped cross-sectional configuration of the raised sidewall portions is in the form of a "U" having diverging sides extending from the bight of the "U".

4. The animal restraint system of claim 10 wherein there is a detachable leg strap for each of the four legs of an animal.

5. The animal restraint system of claim 1 wherein there is a fastener means for a leg strap on the outside of the shell near each of the outer openings.

* * * * *